United States Patent

Grizzle et al.

[11] Patent Number: 5,104,090
[45] Date of Patent: Apr. 14, 1992

[54] IRRIGATION VALVE

[75] Inventors: Glendale Grizzle, Corona; Stephen L. Tyler; Gregory B. Holcomb, both of Diamond Bar; James W. Zimmerman, Walnut, all of Calif.

[73] Assignee: The Toro Company, Minneapolis, Minn.

[21] Appl. No.: 537,916

[22] Filed: Jun. 13, 1990

[51] Int. Cl.⁵ ................. F16K 25/00; F16K 31/126
[52] U.S. Cl. ..................... 251/61.1; 92/99; 251/45; 251/333; 251/358
[58] Field of Search ............... 251/30.01, 30.02, 30.03, 251/30.04, 30.05, 38, 39, 45, 46, 61, 61.1, 331, 335.2, 333, 358, 364; 92/99, 100

[56] References Cited

U.S. PATENT DOCUMENTS

| | | | |
|---|---|---|---|
| 1,659,846 | 2/1928 | Wagner | 251/39 |
| 2,537,308 | 1/1951 | Hansen . | |
| 3,022,039 | 2/1962 | Cone et al. . | |
| 3,240,128 | 3/1966 | Wilson . | |
| 3,358,566 | 12/1967 | Palmer | 92/99 |
| 3,426,798 | 2/1969 | Chernak | 251/331 |
| 3,495,804 | 2/1970 | Muller et al. . | |
| 3,593,956 | 7/1971 | McCarty, Jr. | 251/30.03 |
| 3,655,163 | 4/1972 | Rattan et al. . | |
| 3,672,627 | 6/1972 | McCarty, Jr. et al. | 251/30.03 |
| 3,762,681 | 10/1973 | McKinney et al. . | |
| 3,917,218 | 11/1975 | Marocco | 251/30.03 |
| 4,174,824 | 11/1979 | Kolze | 251/30.03 |
| 4,176,686 | 12/1979 | Stahle . | |
| 4,387,878 | 6/1983 | Zukausky | 251/30.03 |
| 4,505,450 | 3/1985 | Saarem et al. | 251/24 |
| 4,844,112 | 7/1989 | Pick et al. | 251/46 |
| 4,911,401 | 3/1990 | Holcomb et al. | 251/30.03 |

FOREIGN PATENT DOCUMENTS 0012118 6/1980 European Pat. Off. ......... 251/30.03

Primary Examiner—George L. Walton
Attorney, Agent, or Firm—James W. Miller

[57] ABSTRACT

A fluid flow control valve has a resilient diaphragm that engages a valve seat. A line contact is formed between the diaphragm and the valve seat at or closely adjacent the outer diameter of the valve seat. This enhances the ability of the valve to seal under low fluid pressures. The diaphragm is reinforced by a plastic reinforcing member which is formed separately from the diaphragm. The reinforcing member and the diaphragm are inserted together in a press fit, and barbed posts on the reinforcing member hold the two together.

10 Claims, 2 Drawing Sheets though the diaphragm is manufactured. However, this is not a desirable technique as it requires proper positioning of the reinforcing member in the mold cavity, which is difficult to do on a consistent basis. In addition, the cycle time for manufacturing the diaphragm is significantly increased and the rejection rate for finished diaphragms may also be increased due to problems in adhering the reinforcing member to the diaphragm.

IRRIGATION VALVE

TECHNICAL FIELD

This invention relates to a valve for controlling the flow of a fluid, such as an irrigation valve. More particularly, this invention relates to a valve having a flexible, resilient diaphragm which engages a valve seat to shut off the fluid flow through the valve.

BACKGROUND OF THE INVENTION

Flow control valves are well known in irrigation systems. They control the flow of pressurized water through a pipe to turn sprinklers connected to the pipe on and off. Such valves are often remotely controlled by control signals sent from an automated irrigation controller. For example, the controller might send an electric actuating signal to a solenoid that is part of the valve to allow the valve to open.

Various prior art valves use a resilient diaphragm which engages the top of a valve seat for controlling fluid flow through the valve body. The diaphragm is often "pressure balanced" so that inlet fluid pressure is seen on both the top and bottom sides of the diaphragm. The valve is opened by bleeding fluid pressure away from the top side of the diaphragm. This allows the fluid inlet pressure acting on the bottom side of the diaphragm to lift the diaphragm up off the valve seat, thereby opening the valve.

In some cases, the closing force on the diaphragm is achieved by a pressure differential acting on the diaphragm due to the shape of the diaphragm and the proportioning of the top and bottom sides thereof. In other words, the inlet pressure on the top side of the diaphragm has a greater surface area to act against than the surface area on the bottom side of the diaphragm, thus providing a net downward force on the diaphragm urging the diaphragm into engagement with the valve seat. U.S. Pat. Nos. 3,022,039 to Cone and 3,240,128 to Wilson disclose such a valve.

One difficulty with this construction is the inability of the diaphragm to properly seat at relatively low pressure flows, particularly when the diaphragm has been fully opened and is off the valve seat by a considerable distance. In this condition, the differential pressure developed across the diaphragm may not be large enough to cause the diaphragm to reseat. If this happens, the valve will remain open when it should be closed. This is obviously undesirable.

Some valves of this type have used biasing springs acting against the diaphragm to provide a reliable closing force to seat the diaphragm under all fluid pressures for which the valve is rated. However, this is undesirable since the use of extra components, such as a spring, increases the complexity, and hence the expense of manufacturing, the valve. U.S. Pat. No. 3,495,804 to Muller et al discloses a valve of this type having a closing spring acting on the valve diaphragm.

Keeping in mind that valves of this type are typically built to work over a range of flow pressures, from as low a pressure as possible to as high a pressure as possible, it is necessary to reinforce the central portion of the diaphragm to prevent distortion under higher pressure flows. Undue distortion would prevent the diaphragm from properly seating against the valve seat, again causing the valve to leak.

Any reinforcing member used on the diaphragm needs to be securely fixed to the diaphragm to prevent separation therefrom. This is often accomplished by molding the reinforcing forcing member into the diaphragm when the diaphragm is manufactured. However, this is not a desirable technique as it requires proper positioning of the reinforcing member in the mold cavity, which is difficult to do on a consistent basis. In addition, the cycle time for manufacturing the diaphragm is significantly increased and the rejection rate for finished diaphragms may also be increased due to problems in adhering the reinforcing member to the diaphragm.

SUMMARY OF THE INVENTION

Accordingly, one aspect of this invention is to provide an improved irrigation valve of this type which is simple and properly seals even at relatively low fluid inlet pressures.

An improved valve according to this invention comprises an inlet, an outlet, a flow path for liquid flowing from the inlet to the outlet, and a valve seat located in the flow path. A flexible diaphragm is deflectable from a closed orientation in which a sealing portion of the diaphragm engages the valve seat to an open orientation in which the sealing portion of the diaphragm is lifted off the valve seat to open the valve. The diaphragm is manufactured from an elastomeric material having a memory such that a closing force is developed in the diaphragm whenever the diaphragm is deflected out of its closed orientation urging the diaphragm back to its closed orientation. A first side of the diaphragm is exposed to fluid pressure at the inlet and a second side of the diaphragm forms a portion of a pressure chamber for receiving fluid pressure from the inlet. The surface area of the second side of the diaphragm exposed to fluid pressure exceeds the surface area of the first side exposed to fluid pressure such that a net differential force is exerted on the diaphragm by the fluid inlet pressure tending to close the diaphragm against the valve seat. The closing force resulting from the diaphragm memory and the closing force resulting from the net differential force exerted on the diaphragm by the fluid inlet pressure are the only substantial closing forces exerted on the diaphragm.

BRIEF DESCRIPTION OF THE DRAWINGS

The present invention will be described hereafter in the Detailed Description, when taken in conjunction with the following drawings, in which like reference numerals refer to like elements throughout.

DETAILED DESCRIPTION

Figure 1:
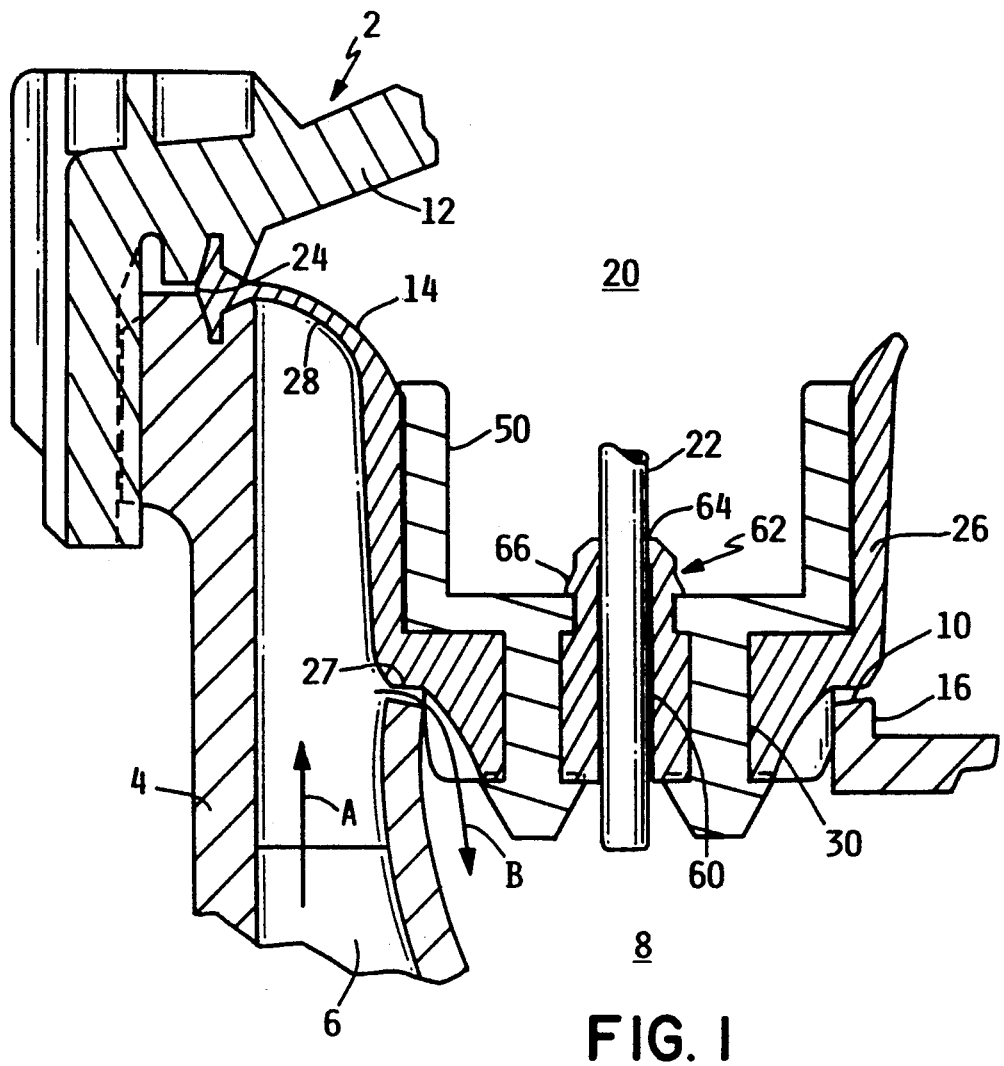
FIG. 1 is a cross-sectional side elevational view of an improved irrigation valve according to the present invention, particularly illustrating the diaphragm and valve seat thereof.

An irrigation valve according to the present invention is illustrated generally in FIG. 1 as 2. Valve 2 includes a valve body 4 having a fluid inlet 6, a fluid outlet 8, and an upwardly facing valve seat 10. Valve body 4 includes a cover 12 separably attached thereto. The valve member which seals against valve seat 10 comprises a resilient diaphragm 14.

As seen in FIG. 1, valve seat 10 is formed by a generally cylindrical wall 16, and specifically by the annular upwardly facing top surface 18 of wall 16. Valve seat 10 is internal to valve body 4 and is formed in any suitable manner therein, e.g. by being molded out of plastic with the rest of valve body 4. Valve 2 as pictured herein is a reverse flow valve. The incoming fluid pressure at inlet 6 flows up around valve seat 10, i.e. in the annular space between valve body 4 and valve seat 10, against the bottom side of diaphragm 14 as indicated by the arrows A. When diaphragm 14 lifts up off valve seat 10, the fluid then flows downwardly into the interior of valve seat 10, and thence out to outlet 8, as shown by the arrows B.

A pressure chamber 20 is formed in valve body 4 between cover 12 and the top side of diaphragm 14. Pressure chamber 20 is normally filled with fluid pressure from inlet 6 through a bleed hole in diaphragm 14. A bleed tube 22 extends downwardly from pressure chamber 20 through diaphragm 14 to terminate in a lower end in the downstream side of valve 2, i.e. in the outlet flow path. Valve 2 is opened by selectively uncovering the top of bleed tube 22 and allowing pressure to be bled off from chamber 20 into the downstream flow path.

Valves of the type described thus far disclosed in either in U.S. Pat. Nos. 4,505,540 to Saarem et al or 4,911,401 to Holcomb et al. The Holcomb patent is assigned to The Toro Company, the assignee of the present invention. These patents are hereby incorporated by reference for teaching various details of the structure and operation of valve 2.

Figure 3:
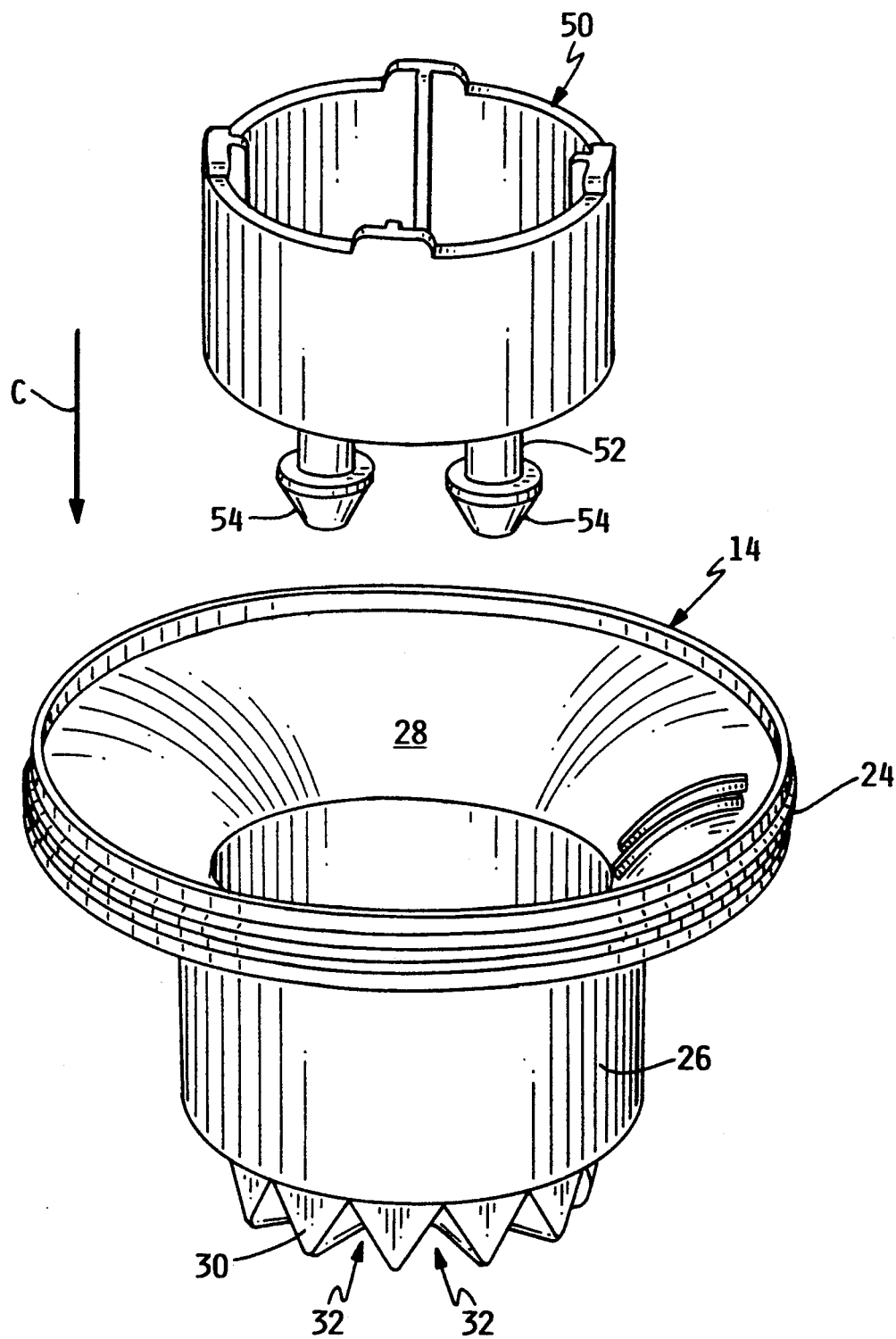
FIG. 3 is a perspective view of the components of the diaphragm assembly, particularly illustrating the rubber diaphragm and the plastic reinforcing member therefor in an exploded form prior to insertion of the reinforcing member in the diaphragm.

The present invention relates particularly to an improved valve seat 10 and valve diaphragm 14. As shown most clearly in FIGS. 1 and 3, diaphragm 14 is molded as a unitary piece from a suitable elastomeric material, such as rubber. Preferably, diaphragm 14 is injection molded from a rubber known as 2080 Alcryn BK. Diaphragm 14 is shaped by the mold cavity to include a peripheral sealing bead 24, a cup-shaped central section 26, and an annular connecting section 28 which joins central section 26 and bead 24 together.

Normally, diaphragm 14 has an undistorted configuration shown in FIG. 1. In this orientation, central section 26 hangs below bead 24 and connecting section 28 curves downwardly between the two. The bottom surface 27 of central section 26 engages valve seat 10 to block fluid flow between inlet 6 and outlet 8. When valve 2 is opened, central section 26 lifts up off valve seat 10 in a vertical direction with connecting section 28 flexing upwardly. Preferably, diaphragm 14 is molded from a material which has an elastic memory so that the material tends always to return to its normal undistorted configuration. Thus, connecting section 28 acts like a return spring to initiate a closing action of diaphragm 14.

Diaphragm 14 includes an integral cylindrical boss 30 extending downwardly from bottom surface 27 of central section 26. Boss 30 is sized to be received inside valve seat 10 in close engagement with the inner diameter of seat 10. Preferably, a plurality of V-shaped radial grooves 32 are provided in boss 30. Grooves 32 taper inwardly in width and height as one proceeds inwardly in a radial direction with the root of groove 32 represented by the arcuate line 34. Grooves 32 allow diaphragm 14 to close smoothly against valve seat 10, without water hammer or the like that might be engendered by a fast, uncontrolled closing.

Figure 2:
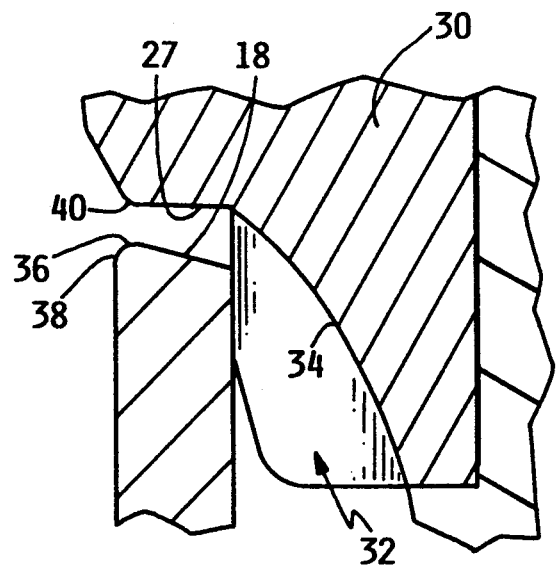
FIG. 2 is an enlarged cross-sectional side elevational view of the coaction between the valve seat and the underside of the diaphragm resulting in a sealing contact.

As shown in FIGS. 1 and 2, the annular area of bottom surface 27 lying outside boss 30, i.e. the area overlying valve seat 10, is substantially planar. However, valve seat 10 is not planar. Instead, the top surface 18 which forms valve seat 10 is angled downwardly from an uppermost point or apex 36 located at or closely adjacent the outer diameter of valve seat 10. As shown more clearly in FIG. 2, apex 36 is not precisely at the outer diameter of valve seat 10, though it could be. Instead, apex 36 is spaced slightly inwardly from the outer diameter by a small radiused curved portion 38 which, for the sake of manufacturing ease, connects apex 36 to the side wall of valve seat 10. However, apex 36 is generally aligned with the outermost edge 40 of bottom surface 27 on diaphragm 14. The top surface 18 of valve seat 10 slopes downwardly away from the apex 36 as one proceeds in a radially inwardly direction.

As is apparent, apex 36 of valve seat 10 engages the planar portion of bottom surface 27 along a line located approximately at the outer diameter of valve seat 10, rather than being set inwardly at the midpoint of valve seat 10 or even the inner diameter thereof as in conventional valves. When diaphragm 14 is closed on valve seat 10, the force acting on valve seat 10 tending to keep the diaphragm in engagement with the seat increases with the area of the valve seat. Thus, for a valve seat 10 of a given diameter, which is often dictated by flow or manufacturing requirements, use of a line contact at approximately the outer diameter of valve seat 10 maximizes the effective area of the valve seat. In addition, since a line contact is used, as opposed to a face contact, the effective sealing force is further distributed over the least possible area, thereby enhancing the load per unit area. It has been found that a valve 2 constructed as shown herein will seal at lower fluid pressures than one with a more conventionally shaped valve seat, i.e. at pressures in the range of 15 to 20 p.s.i.

As noted in the Background of the Invention section of this application, it is necessary to reinforce the central section 26 of diaphragm 14 to prevent that section from distorting under higher fluid pressures. This is done in valve 2 with a simple cup-shaped reinforcing member 50 designed to closely fit within cup-shaped central section 26. Reinforcing member 50 has at least one, and preferably two, downwardly extending securing posts 52 having barbed heads 54 on the lower end thereof. Two holes extend through boss 30 of diaphragm 14 for receiving posts 52. Reinforcing member 50 is made from a high-strength, low weight plastic material.

Diaphragm 14 and reinforcing member 50 are manufactured separately. The two are then united simply by press-fitting reinforcing member 50 into diaphragm 14 as shown by the arrows C in FIG. 3 until the reinforcing member 50 abuts against the bottom of central section 26. In this position, posts 52 have passed through boss 30 and barbed heads 54 are now in engagement with the bottom of boss 30. See FIG. 1. Barbed heads 54 are shaped to prevent reinforcing member 50 from separating from diaphragm 14.

As shown in FIG. 1, diaphragm 14 includes a central aperture 60 through which bleed tube 22 passes. Preferably diaphragm 14 includes an upwardly extending stem 62 having a lip seal 64 on the inner diameter thereof for sealing against bleed tube 22. It would be possible for fluid to leak down around stem 62 and around reinforcing member 50 as chamber 20 has fluid under pressure and the interior of valve seat 10 is at atmospheric pressure when diaphragm 14 is closed. This leakage is prevented, however, by forming an annular lip seal 66 on the outside diameter of stem 62 overlying the junction between stem 62 and reinforcing member 50. Lip seal 66 is compressed by reinforcing member 50 as reinforcing member 50 is inserted into diaphragm 14, and then springs outwardly to the configuration shown in FIG. 1.

In designing valve 2, Applicants discovered that the material of diaphragm 14 which is backed by reinforcing member 50 is significantly harder, or less flexible, than the material lying radially outside of it. Thus, the line contact between apex 36 and bottom surface 27 is desirably located radially outside of reinforcing member 50. Bottom surface 27 is somewhat softer there and can more easily conform to valve seat 10 to establish the sealing contact therewith.

In addition, small bubbles or irregularities at the base of grooves 32 are sometimes present when molding diaphragm 2. If this occurs, bottom surface 27 and valve seat 10 are sufficiently wide so that the line contact between apex 36 and bottom surface 27 is located radially outside this zone of irregularities adjacent the outer ends of grooves 32. This further enhances the sealing ability of diaphragm 14 with valve seat 10.

Valve 2 according to the present invention has numerous advantages. First, it is easy to construct and is relatively inexpensive to manufacture. For example, diaphragm 14 is molded from a material having an elastic memory such that a closing force is developed in diaphragm 14 whenever it is deflected out of its normal, closed configuration. Thus, the use of a separate closing spring is avoided. Moreover, valve 2 does not require reinforcing member 50 to be molded into diaphragm 14, yet reinforcing member 50 is securely locked into place by barbed posts 52. Reinforcing member 50 is thus held to diaphragm 14 with a minimum of parts and diaphragm 14 and reinforcing member 50 are simply press fit together.

In addition, the line contact feature of this invention, located approximately at the outer diameter of valve seat 10, allows diaphragm 14 to close at relatively low fluid pressures. Thus, valve 2 can be used over a wide fluid pressure range, e.g. from 20-200 p.s.i. Valve body 10 and cover 12 are desirably made of plastic materials. However, any other suitable material may be used.

Various other modifications of this invention will be apparent to those skilled in the art. Thus, the scope of this invention is to be limited only by the appended claims.

We claim:

1. An improved fluid flow control valve of the type having a fluid inlet, a fluid outlet, a valve seat located between the fluid inlet and the fluid outlet, and a movable valve member for engaging the valve seat to prevent fluid from flowing between the fluid inlet and the fluid outlet, wherein the improvement relates to the valve seat and valve member and comprises:
    (a) a generally cylindrical tube having a predetermined thickness lying between an inner diameter of the tube and an outer diameter of the tube, wherein the tube has an annular top surface extending between the inner tube diameter and the outer tube diameter which annular top surface of the tube forms the valve seat;
    (b) a valve member that includes a resilient diaphragm; and
    (c) means forming a line contact between the diaphragm and the top surface of the valve seat at or relatively closely adjacent the outer diameter of the valve seat, wherein the diaphragm includes a relatively planar sealing surface substantially overlying the top surface of the valve seat, wherein the top surface of the valve seat has an apex at or relatively closely adjacent the outer diameter thereof which apex is in contact with a portion of the sealing surface, and wherein the top surface is angled downwardly and is spaced away from the remainder of the sealing surface as one proceeds from the apex towards the inner diameter of the valve seat such that only the apex is in contact with the diaphragm to allow the diaphragm to seat at relatively small fluid pressures.

2. An improved fluid flow valve as recited in claim 1, further including a small radiused curved section between the apex of the top surface of the valve seat and the outer diameter of the valve seat such that the line contact is relatively closely adjacent, but spaced slightly inwardly from, the outer diameter.

3. An improved fluid flow valve as recited in claim 2, wherein the line contact between the apex and the diaphragm is generally aligned with an outermost edge of the sealing surface.

4. An improved fluid flow valve as recited in claim 1, wherein the diaphragm further includes means secured to a central portion thereof for stiffening the diaphragm to resist deformation of the diaphragm under differential fluid pressure.

5. An improved fluid flow valve as recited in claim 1, wherein the diaphragm further includes means secured to a central portion thereof for stiffening the diaphragm to resist deformation of the diaphragm under differential fluid pressure, wherein the line contact between the diaphragm and the valve seat is located radially outside of the stiffening means.

6. An improved fluid flow valve as recited in claim 1, wherein the diaphragm has a bottom surface that includes a cylindrical boss projecting downwardly therefrom, wherein the boss is sized to fit relatively closely within the inner diameter of the valve seat, and wherein that portion of the bottom surface of the diaphragm surrounding the boss forms an annular sealing surface substantially overlying the top surface of the valve seat.

7. An improved fluid flow valve as recited in claim 6, wherein the diaphragm is made of rubber with the boss being molded as part of the diaphragm, wherein the boss includes a plurality of inwardly extending, radial grooves formed therein, wherein each groove has an outer end located on a circumferential side wall of the boss, and wherein the line contact formed between the sealing surface of the diaphragm and the top surface of the valve seat is sufficiently spaced away from the outer end of the grooves to be unaffected by any irregularities in the sealing surface of the diaphragm adjacent the grooves formed in the boss.

8. An improved fluid flow valve as recited in claim 4, further including:
    (a) a unitary stiffening member for stiffening the central portion of the diaphragm, wherein the stiffening member is made of a sufficiently stiff material to prevent the central section from deforming over the range of differential pressures seen by the diaphragm during use of the valve; and (b) engagement means for securing the diaphragm and the stiffening member together in a press fit.

9. An improved fluid flow valve as recited in claim 8, wherein the engagement means includes barb means for locking the stiffening member to the diaphragm.

10. An improved fluid flow control valve of the type having a fluid inlet, a fluid outlet, a valve seat located between the fluid inlet and the fluid outlet, and a movable valve member for engaging the valve seat to prevent fluid from flowing between the fluid inlet and the fluid outlet, wherein the improvement relates to the valve seat and valve member and comprises:

(a) a valve seat defined by an annular top surface extending between an inner diameter and an outer diameter thereof;

(b) a valve member which comprises:
  (i) a resilient diaphragm; and
  (ii) means secured to a central portion of the diaphragm for stiffening the diaphragm to resist deformation of the diaphragm under differential fluid pressure; and (c) means forming a line contact between the diaphragm and the top surface of the valve seat, wherein the line contact between the diaphragm and the valve seat is located radially outside of the stiffening means, wherein the diaphragm includes a relatively planar sealing surface substantially overlying the top surface of the valve seat, wherein the top surface of the valve seat has an apex at or relatively closely adjacent the outer diameter thereof which apex is in contact with a portion of the sealing surface, and wherein the top surface is angled downwardly and is spaced away from the remainder of the sealing surface as one proceeds from the apex towards the inner diameter of the valve seat such that only the apex is in contact with the diaphragm to allow the diaphragm to seat at relatively small fluid pressures.

* * * * *